United States Patent [19]
Janson et al.

[11] Patent Number: 5,732,594
[45] Date of Patent: Mar. 31, 1998

[54] MANUAL TRANSMISSION WITH THROTTLE ACTUATED DOWNSHIFT

[75] Inventors: David A. Janson, Plymouth; Rudolf Beim, Bloomfield Hills, both of Mich.

[73] Assignee: Ford Global Technologies, Inc., Dearborn, Mich.

[21] Appl. No.: 741,997

[22] Filed: Oct. 31, 1996

[51] Int. Cl.$^6$ ............................................. F16H 3/087
[52] U.S. Cl. ................................. 74/333; 192/84.6
[58] Field of Search ........................... 74/333; 192/20, 192/84.6, 84.7

[56] References Cited

U.S. PATENT DOCUMENTS

| | | |
|---|---|---|
| 4,203,498 | 5/1980 | Kodama . |
| 4,252,031 | 2/1981 | Nishimura et al. . |
| 4,368,650 | 1/1983 | Numazawa et al. . |
| 4,416,168 | 11/1983 | Arai et al. . |
| 4,561,325 | 12/1985 | Jester . |
| 4,633,725 | 1/1987 | Jones . |
| 4,674,358 | 6/1987 | Nishimura . |
| 4,722,248 | 2/1988 | Braun . |
| 4,754,665 | 7/1988 | Vandervoort . |
| 4,788,889 | 12/1988 | Davis et al. . |
| 4,831,894 | 5/1989 | Braun . |
| 4,882,951 | 11/1989 | Braun . |
| 4,901,600 | 2/1990 | Wilson . |
| 4,976,347 | 12/1990 | Sakakibara et al. ............. 192/20 |
| 5,019,021 | 5/1991 | Janson . |

OTHER PUBLICATIONS

1985 Honda City Motor Vehicle (sold in Japan) Service Manual.

Primary Examiner—Dirk Wright
Attorney, Agent, or Firm—James J. Dottavio

[57] ABSTRACT

A transmission includes an input shaft, an output shaft parallel the input shaft and a sleeve shaft rotatably supported by the input shaft. A clutch is provided to selectively engage one the input shaft and the sleeve shaft. The input shaft is releasably engageable with the sleeve shaft. Multiple forward gear and pinion pairs are provided wherein one gear of each of the gear and pinion pairs is supported by the sleeve shaft and the second of each gear of the gear and pinion pairs is supported by the output shaft. A transfer gear is rotatably supported by the output shaft and drivably connected to the input shaft. The transfer gear is selectively drivably connected to the sleeve shaft and the output shaft.

19 Claims, 4 Drawing Sheets

MANUAL TRANSMISSION WITH THROTTLE ACTUATED DOWNSHIFT

BACKGROUND OF THE INVENTION

1. Field of the Invention

The present invention relates to a vehicular transmission, and in particular to a manual transmission having an auxiliary transmission with high and low speeds.

2. Discussion of the Prior Art

A transmission of this kind is known in the prior art, as shown in U.S. Pat. No. 4,674,358, to Nishimura ('358 patent). In the '358 patent, a transmission is provided in which a manual transmission is connected in series to an auxiliary transmission having high and low speeds. An hydraulic clutch drivably engages a high speed gearset. A one-way clutch permits a low speed gear to be drivably engaged when the hydraulic clutch is released and the high speed gearset remains engaged.

It would be desirable to provide a manual transmission with a high and low speed gearset having fewer gearsets. It would also be desirable to produce such a transmission which does not use a hydraulic clutch, thereby providing less parasitic losses and allowing for easier conversion of existing transmission designs to a transmission having an auxiliary transmission with high and low speed ranges.

SUMMARY OF THE INVENTION

In accordance with the objects of this invention, a manual transmission having an auxiliary transmission is provided with a minimum number of gearsets. A preferred embodiment does not use a hydraulic clutch to engage a high and low speed gearsets of the auxiliary transmission. Thus, the present invention provides a manual transmission having an auxiliary transmission, which requires minimal package space at lower cost and which is adaptable to existing transmission designs.

These advantages and objectives are realized in a transmission, according to this invention, which includes an input shaft, an output shaft parallel the input shaft, and a sleeve shaft rotatably supported by the input shaft. A clutch is provided to selectively engage the input shaft and the sleeve shaft.

The input shaft is releasably engageable with the sleeve shaft. Multiple forward gear and pinion pairs are provided, wherein one gear of each of the gear and pinion pairs is supported by the sleeve shaft and the second of each gear of the gear and pinion pairs is supported by the output shaft. A transfer gear is rotatably supported by the output shaft and drivably connected to one of the output shaft and the sleeve shaft.

DETAILED DESCRIPTION OF PREFERRED EMBODIMENTS

Figure 1:
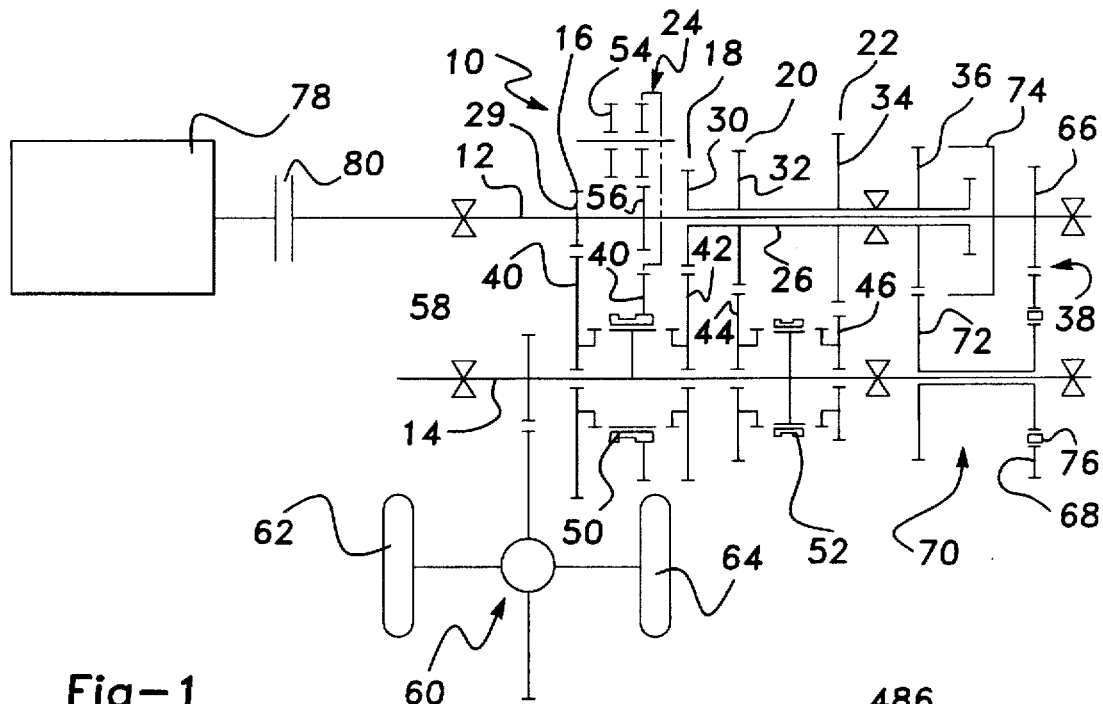
FIG. 1 is a schematic of a prior art transmission having a high and low speed gearset.

In a prior art transmission as shown in FIG. 1, and described in U.S. Pat. No. 4,674,358, to Nishimura ('358 patent), which is incorporated herein by reference, a manual transmission 10 is provided with an input shaft 12 parallel an output shaft 14. A plurality of forward gear and pinion pairs 16, 18, 20, 22 and a reverse gear and pinion pair 24 are provided. A sleeve shaft 26 carrying a cluster gear 28 is rotatably supported by the input shaft 12. The cluster gear 28 includes a plurality of input gears 30, 32, 34 for a plurality of forward gear and pinion pairs 18, 20, 22 and a secondary driven gear 36 from an auxiliary transmission 38. The output shaft 14 rotatably supports a plurality of output gears 40, 42, 44, 46, 48, which mate with the plurality of forward gears 30, 32, 34 and the reverse gear 36 to form the gear and pinion pairs 16, 18, 20, 22, 24 described above.

The forward gear and pinion pairs are selected using synchronizers 50, 52 carried by the output shaft 14. Reverse gear 24 is selected by engaging an idler gear 54 between a reverse gear 56 fixed to the input shaft 12 and a reverse output gear 48 formed on a synchronizer 50 carried by the output shaft 14. The output shaft 14 drives an output gear 58, which drivably engages a differential 60 to produce power at the drive wheels 62, 64 of a motor vehicle, as is well known in the art.

The auxiliary transmission 38 is connected in series between the input shaft 12 and cluster gear 28 to provide for high and low speed ranges. The auxiliary transmission 38 includes a primary driving gear 66 fixed to the input shaft 12, which engages a primary driven gear 68 of a transfer gear 70 supported rotatably by the output shaft 14. A secondary drive gear 72 is carried by the transfer gear 70. The secondary driving gear 72 engages a secondary driven gear 36 carried by the cluster gear 28. In this arrangement, in low range, the power flow is from the input shaft 12 through the primary drive gear 66 to the transfer gear 70 to the cluster gear 28, then through a reduction gear and pinion pair 18, 20, or 22 to the output shaft 14. The transfer gear 70 performs a gear reduction to put the transmission in the low operating range. Thus, the transfer gear 70 does not directly transmit power to the output shaft 14, but the power flow travels through a reduction gearset in the cluster gear 28.

The auxiliary transmission 38 further includes an hydraulic clutch 74, which selectively drivably engages the input shaft 12 directly to the cluster gear 28. In such an arrangement, power flow is from the input shaft 12 through the hydraulic clutch 74 to the cluster gear 28, through a reduction gearset 18, 20, 22 to the output shaft 14.

A one-way clutch 76 is provided between the input shaft 12 and the transfer gear 70, so that when the hydraulic clutch 74 is engaged, the undesired input from the input shaft 12 through the clutch 74 to the cluster gear 28 to the transfer gear 70 overruns the one-way clutch 76, and the driving engagement between the primary drive gear 66 and the transfer gear 70 is thereby overrun. The one-way clutch 76 further permits engine braking by providing a torque flow path from the output shaft 14 through the one of the gear and pinion pairs 18, 20, or 22, through the transfer gear 70 through the one-way clutch 76 to the primary driving gear 66 to the input shaft 12, and to the engine 78 through the clutch 80 without requiring the sleeve shaft 26 to be connected to the input shaft 12 through the hydraulic clutch 74.

In a preferred embodiment of the present invention, as shown in FIGS. 2–5, similar components will be designated with a number having a prefix of 2 through 5, respectively. In the embodiment shown in FIG. 2, a manual transmission 210 is provided which includes an input shaft 212 and a parallel output shaft 214. The input shaft 212 rotatably supports a sleeve shaft 226 comprising a cluster gear 228, which includes four gears 229, 230, 231, 232 of forward gear and pinion pairs 216, 218, 220 and 222. A reverse gear 256 and a primary drive gear 266 are fixed to the input shaft 212. The output shaft 214 rotatably supports a transfer gear 270, a plurality of forward gears 240, 242, 244, 246, and a reverse gear 248. The forward gears 240-246 are engaged with the forward gears 229-234 of the cluster gear 228, and are selected using a pair of synchronizers 250, 252 having a splined connection 282, 284 with the output shaft 214, as is known in the art. The transfer gear 270 is engaged with the primary drive gear 266 and a secondary driven gear 234 carried by the sleeve shaft 228, the secondary drive gear 272 in the preferred embodiment also serving as the output gear to the fourth gear and pinion pair 222. A one-way clutch 276 is provided between the input shaft 212 and the cluster gear 228.

The one-way clutch 276, in a preferred embodiment, is provided on the transfer gear 270 between the primary driven gear 268 and the secondary drive gear 272 to permit direct connection between the input shaft 212 and cluster gear 228, as described above with reference to the '358 patent. Alternatively, the one-way clutch could comprise a clutch (not shown) to releasably engage the input shaft 212 and the transfer gear 270, as is known in the art.

The input shaft 212 is drivably connectable to the sleeve shaft 228, preferably through a mechanical multi-plate clutch 274. When a downshift is commanded through throttle manipulation, a controller (not shown) commands the clutch 274 to be released by sending a signal to an electric motor 288, thus allowing drive torque to flow through the transfer gear 270 to the cluster gear 228 and thus effecting a lower gear ratio. In a preferred embodiment, in fourth gear 222, the down shift ratio is identical to the ratio achieved by the transfer gearset 270.

In a preferred embodiment, the clutch 274 is actuated by a ball ramp mechanism 286. Ball ramp mechanisms are generally known, an example of which is described in U.S. Pat. No. 5,019,021, to Janson ('021 patent), which is incorporated herein by reference. In a preferred embodiment, the ball ramp mechanism 286, as shown in greater detail in FIG. 4, includes a D.C. motor 488 drivably connected to a spur gearset 490, which drivably engages an outer actuating plate 492 having preferably three circumferentially-spaced arcuate first ball ramp surfaces 493, as described in the '021 patent. The number of balls affects the mechanical advantage of the plates, such that three balls provide the maximum rotation and thus the maximum mechanical advantage. A minimum of three balls are required to define the plane in which the plates are held. Additional balls may be desired for a larger load or where such a mechanical advantage is not required. A second outer actuating plate 496 is provided axially spaced from the first plate 492. The second plate 496 has corresponding arcuate second ball ramp surfaces 495.

Figure 4:
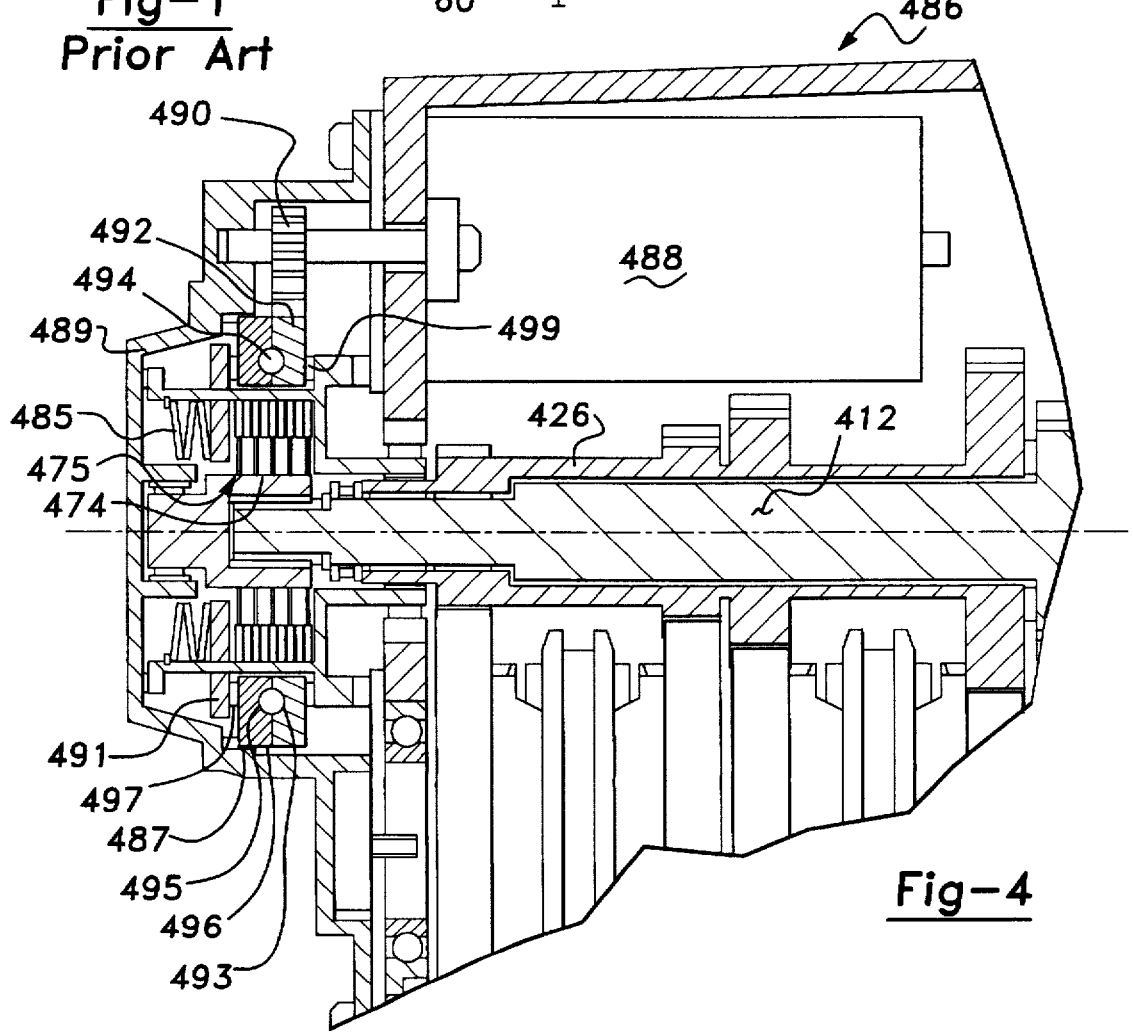
FIG. 4 is a partial sectional view of a ball ramp mechanism according to the present invention.

A ball 494 is positioned between each pair of ball ramp surfaces 493, 495. The first actuating plate 492 is held axially against displacement by bearing 499, and rotates as the spur gear 490 is rotated, thereby effecting rotational movement of the ball ramps 493 and, therefore, axial movement of the balls 494, as described in the '021 patent. The second actuating plate 496 is held against rotation, but is allowed to move axially as the balls 494 are moved axially, preferably through a splined connection 487 between the plate 496 and the case 489. As the second plate 496 moves axially, it forces a clutch actuating plate 491 axially. As the clutch actuating plate 491 is moved leftward as shown in FIG. 4, the plurality of clutch discs 475 provided in interdigital relationship between the input shaft 412 and sleeve shaft 426 are released, and the driving relationship between the input shaft 212 and the sleeve shaft 226 is released. relationship between the input shaft 212 and the sleeve shaft 226 is released.

A plurality of Belleville washers 485 are provided between the clutch actuating plate 491 and the end of the sleeve shaft 426, urging the clutch discs 475 back into driving engagement when the first plate 492 is rotated by the motor 488 back to a clutch engagement position. One skilled in the art recognizes these washers 485 could alternatively be replaced by known spring devices. A thrust bearing 497 is provided between the clutch actuating plate 491 and the second plate 496 so the clutch actuating plate 491 and sleeve shaft 426 are able to rotate relative to the second plate 496 and the case 489. A second thrust bearing 499 is provided between the first plate 492 and the sleeve shaft 426 to permit relative rotation of the first plate 492 and prevent axial displacement thereof. A ball ramp mechanism 486 as described above permits use of a relatively small D.C. electric motor 488 to cause disengagement of the clutch 474 due to the large mechanical advantage provided as described above. Thus, the package requirements of such a mechanism are minimized.

Figure 5:
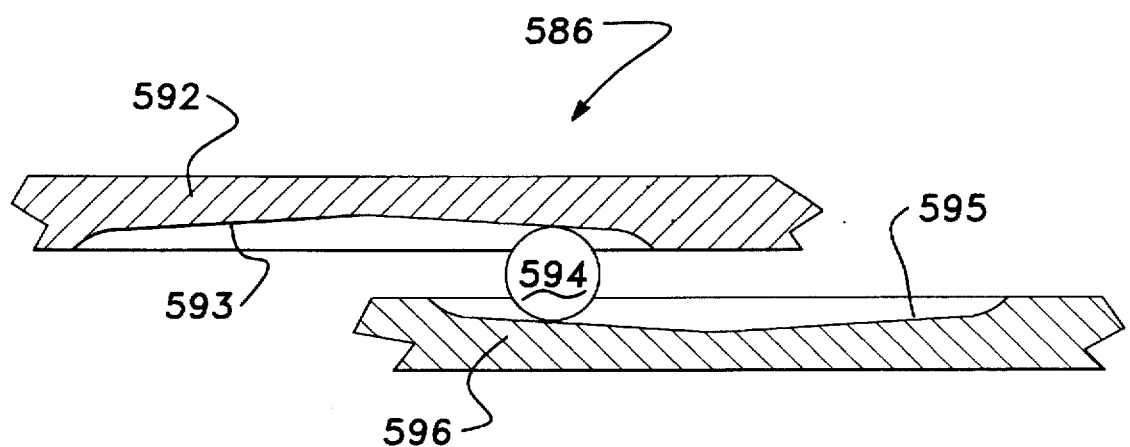
FIG. 5 is a partial cross sectional view of the ball ramp mechanism shown in FIG. 4.

As shown in FIG. 5, the actuating plates 592, 596 carry three pairs of mirror image ramps 593, 595, respectively. Three balls 594 are interposed between the ramps 593, 595. The pitch of the ramps provides a 25:1 mechanical advantage in the disengagement of the clutch. As described above, the rotary motion of the clutch disengagement motor 288 goes through an 8:1 reduction spur gearset 290 into the plates 592, 596. Thus, the overall mechanical advantage from the motor to the clutch is a 200:1 mechanical advantage in applying the axial force. The radius of each ball ramp 593, 595 is approximately 1.68 inches. Therefore, a one pound foot D.C. motor in the preferred embodiment produces a 1,428 pound axial force on the clutch pack 274.

Utilization of an electric motor 288 as in the preferred embodiment produces less parasitic loss than a hydraulic clutch 74, as in the prior art. Furthermore, adaptation of a transmission to include the ball lock clutch 274 taught in the present application is more easily facilitated in existing transmission designs as an add-on component than adding an hydraulic clutch 74 as taught in the prior art, due to package, efficiency and weight constraints. However, one skilled in the art recognizes that the clutch and ball ramp mechanism of the present invention could alternatively comprise a variety of clutching mechanisms, as are known in the art.

Figure 2:
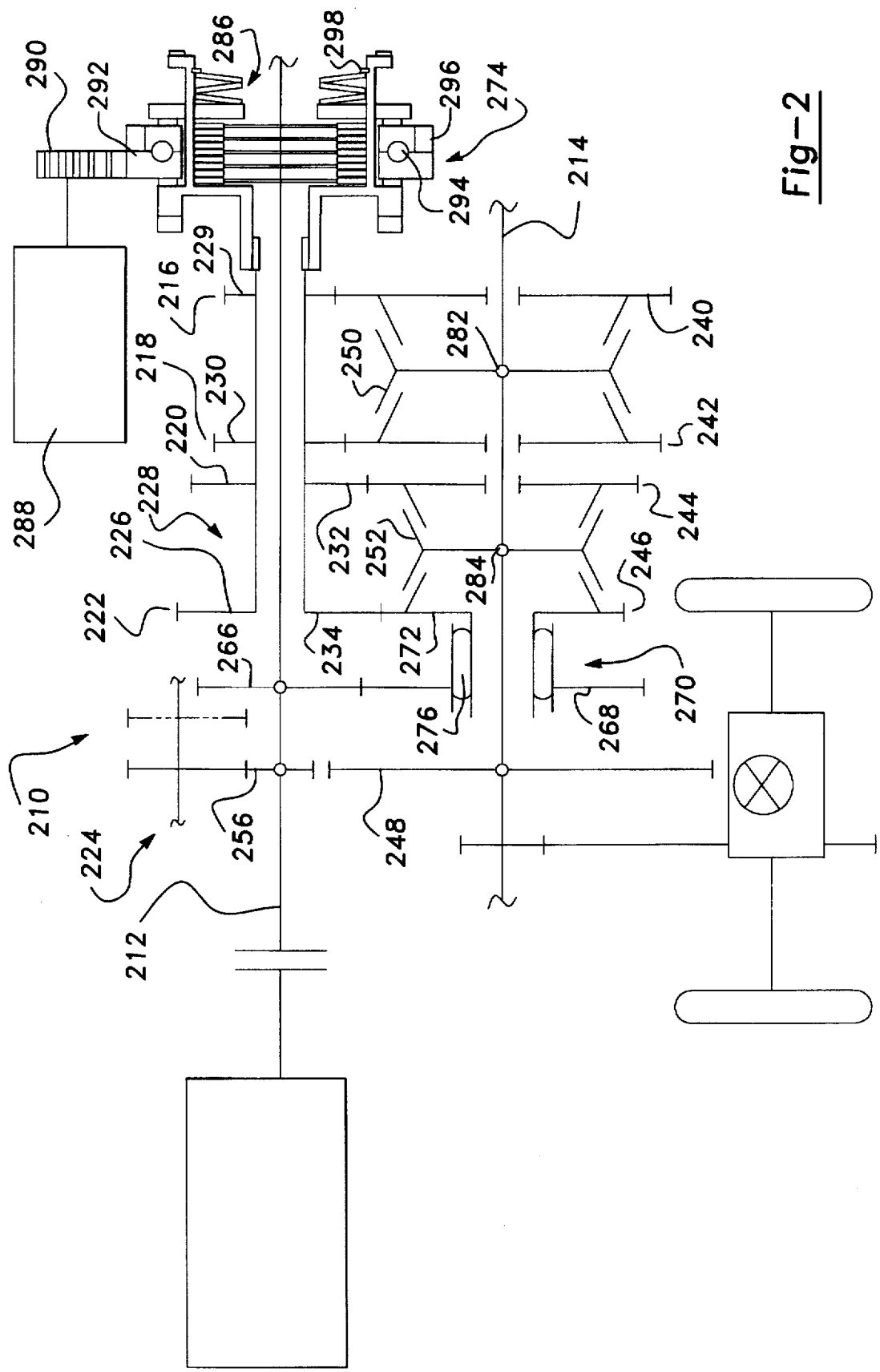
FIG. 2 is a schematic of an embodiment of a transmission according to the present invention.

The arrangement of a transmission according to a preferred embodiment of the present invention, as shown in FIGS. 1-2, provides eight forward gear ratios, using five gear and pinion pairs 216, 218, 220, 222, and 266/268. The prior art teaches seven forward ratios, using six gear and pinion pairs 16, 18, 20, 22, 36/72, and 66/68. The small number of gear and pinion pairs used by the present invention is obtained using one gear and pinion pair 222, which both transfers power through the transfer gear 270 and provides a drive ratio to the output shaft 214. This is achieved by providing one synchronizer 252 on the output shaft 214 which engages the transfer gear 270, thereby providing an output ratio from the transfer gear 270. Thus, for example, when fourth gear is selected, the power flow goes from the input shaft 212 to the primary drive gear 266 to the transfer gear 270 through the synchronizer 252 directly to the output shaft 214 and not through a further reduction on the cluster gear 228. In the prior art, as shown in FIG. 1, each of the lower ratios are transmitted from the input gear 66 through the transfer gear 70 to the sleeve shaft 26 and through a second gear and pinion pair 18, 20, or 22 to the output shaft 14. Therefore, the present arrangement provides a much more compact transmission and requires fewer gear and pinion pairs while producing more gear ratios.

Figure 3:
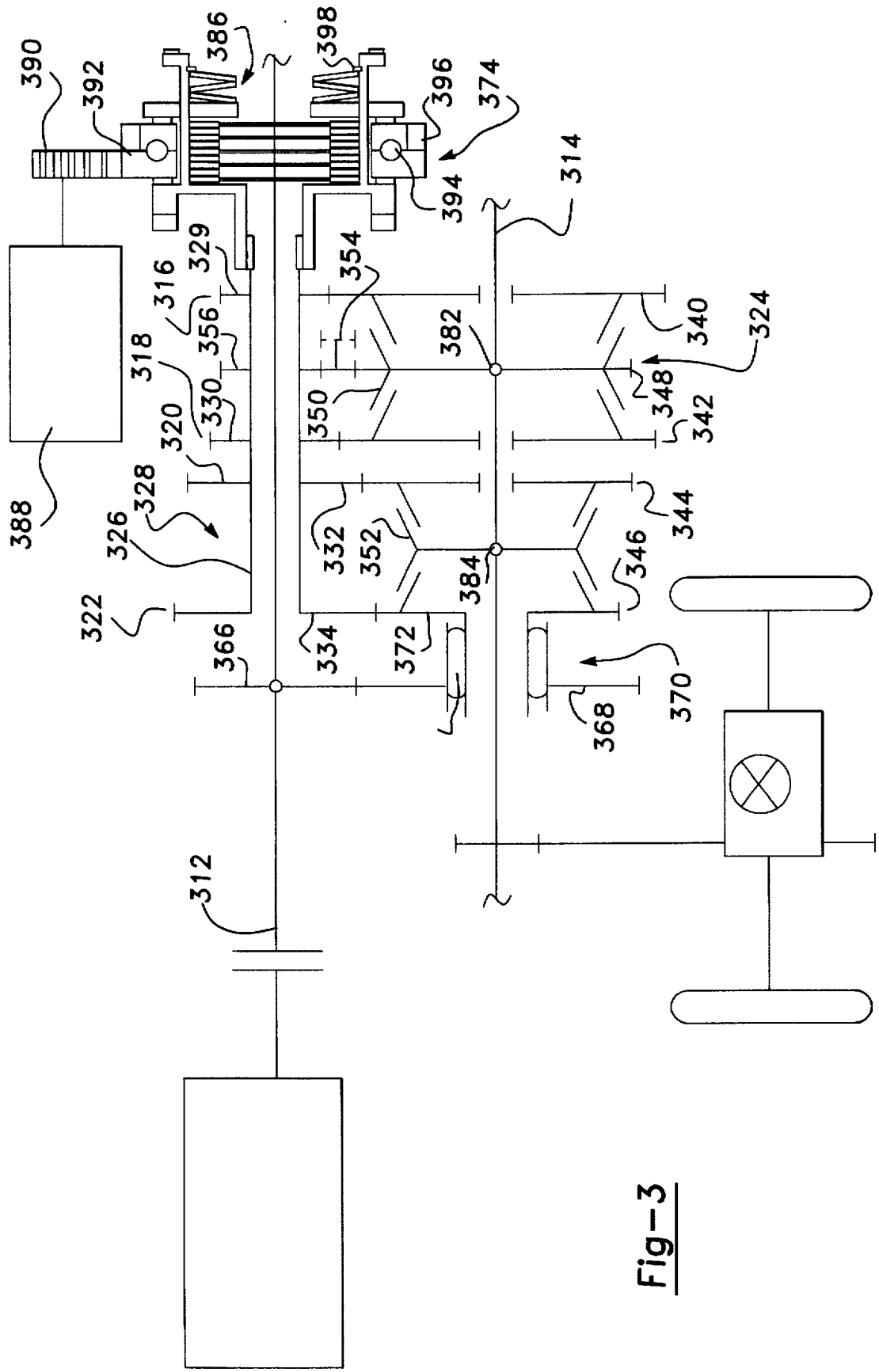
FIG. 3 is a schematic of an alternative embodiment of a transmission according to the present invention.

In the alternative embodiment, shown in FIG. 3, the reverse gear and pinion pair 324 has a gear 356 carried by the sleeve shaft 326, and preferably engages a gear 348 formed on the 1-2 synchronizer 350 carried by the output shaft 314 through a reverse idler 354. Thus, the alternative embodiment, shown in FIG. 3, is able to produce two reverse ratios where such reduction is desired by using the clutch 374 to drivably engage the input shaft 312 to the cluster gear 328 or by using the transfer gear 370 to drive the cluster gear 328, as described above.

The present invention preferably is used to improve fuel economy by operating in the high ratio with the clutch 274 engaged during normal driving. Under hard acceleration or when the driver so selects, the electric motor 288 disengages the clutch 274, thereby producing a lower drive ratio and increasing the performance. It is envisioned that a manual override switch (not shown) may be provided in the motor vehicle so the operator may select a "performance" or "economy" mode, and thereby select to unlock or lock the clutch 274, respectively.

It is to be understood that the specific mechanism and techniques which have been described merely illustrate one application of the principles of the present invention. Numerous modifications may be made to the methods and apparatus described herein without departing from the true spirit and scope of the invention.

We claim:

1. An automotive transmission comprising:
   an input shaft;
   a sleeve shaft rotatably supported by the input shaft;
   a clutch means for selectively drivably engaging the input shaft and the sleeve shaft;
   an output shaft parallel to the input shaft;
   means for releasably connecting the input shaft and the sleeve shaft;
   multiple forward gear and pinion pairs, one gear of each of said gear and pinion pairs supported by said sleeve shaft and the second of each of said gear and pinion pairs supported by the output shaft; and
   a transfer gear rotatably supported by the output shaft drivably connected to the input shaft and selectively drivably connected directly to one of the group comprising the sleeve shaft and the output shaft.

2. The manual transmission according to claim 1, wherein one of said gear and pinion pairs is meshingly engaged with said transfer gear.

3. The manual transmission according to claim 2, wherein the means for releasing the input shaft and the transfer gear comprises a one-way clutch provided on the transfer gear between input and output portions of the transfer gear.

4. A manual transmission according to claim 3, wherein the clutch means comprises a multiple plate clutch.

5. A manual transmission according to claim 4, wherein the clutch means further comprises a ball ramp mechanism for releasing the clutch.

6. A manual transmission according to claim 5, wherein the ball ramp mechanism comprises:
   a transmission case;
   a spring provided between the sleeve shaft and the clutch discs to urge said discs into frictional engagement;
   an electric motor supported by the transmission case; and
   a pair of ball ramp actuating plates having a ball positioned therebetween, the first of said plates being drivably connected to said motor whereby said ball is forced up a ramp to axially move said second plate and urge the clutch plates out of frictional engagement.

7. A manual transmission according to claim 4, further comprising a pair of synchronizers carried by the output shaft to selectively engage two of said gearsets.

8. A manual transmission according to claim 7, wherein one of said two of said gearsets comprises the gearset meshingly engaged with said transfer gear.

9. A manual transmission according to claim 8, further comprising a reverse gear carried by the input shaft, a reverse idler gear rotatably supported by the transmission case and a reverse output gear supported by the output shaft.

10. A manual transmission according to claim 8, further comprising a reverse input gear carried by the sleeve shaft and one of said synchronizers releasably engaged to said reverse input gear for producing an output gear ratio.

11. An automotive transmission comprising:
   an input shaft;
   a sleeve shaft rotatably supported by the input shaft;
   a clutch means for selectively drivably engaging the input shaft and the sleeve shaft;
   an output shaft parallel to the input shaft;
   multiple forward gear and pinion pairs, one gear of each of said gear and pinion pairs supported by said sleeve shaft and the second of each of said gear and pinion pairs supported by the output shaft;
   a transfer gear including an input gear and an output gear rotatably supported by the output shaft drivably connected to the input shaft and selectively drivably connected directly to one of the group comprising the sleeve shaft and the output shaft; and
   a one-way clutch provided on said transfer gear between the input gear and the output gear for releasably engaging said transfer gear and said sleeve shaft.

12. The manual transmission according to claim 11, wherein one of said gear and pinion pairs is meshingly engaged with said transfer gear.

13. A manual transmission according to claim 12, wherein the clutch means comprises a multiple plate clutch.

14. A manual transmission according to claim 13, wherein the clutch means further comprises a ball ramp mechanism for releasing the clutch.

15. A manual transmission according to claim 14, wherein the ball ramp mechanism comprises:
   a transmission case;
   a spring provided between the sleeve shaft and the clutch discs to urge said discs into frictional engagement;
   an electric motor supported by the transmission case; and
   a pair of ball ramp actuating plates having a ball positioned therebetween, the first of said plates being drivably connected to said motor whereby said ball is forced up a ramp to axially move said second plate and urge the clutch plates out of frictional engagement.

16. A manual transmission according to claim 15, further comprising a pair of synchronizers carried by the output shaft to selectively engage two of said gearsets.

17. A manual transmission according to claim 16, wherein one of said two of said gearsets comprises the gearset meshingly engaged with said transfer gear.

18. A manual transmission according to claim 17, further comprising a reverse gear carried by the input shaft, a reverse idler gear rotatably supported by the transmission case and a reverse output gear supported by the output shaft.

19. A manual transmission according to claim 17, further comprising a reverse input gear carried by the sleeve shaft and one of said synchronizers releasably engaged to said reverse input gear for producing an output gear ratio.

* * * * *